United States Patent [19]

Ziska

[11] Patent Number: 4,911,012
[45] Date of Patent: Mar. 27, 1990

[54] SEWER LINE DETECTION SYSTEM

[76] Inventor: Thomas J. Ziska, 2808 Kersdale Ave., Pepper Pike, Ohio 44124

[21] Appl. No.: 169,859

[22] Filed: Mar. 18, 1988

[51] Int. Cl.$^4$ .............................................. G01H 17/00
[52] U.S. Cl. ...................................... 73/584; 367/120
[58] Field of Search ............ 73/584, 591, 592, 40.5 A, 73/596, 618, 865.8; 367/93, 104, 120

[56] References Cited

U.S. PATENT DOCUMENTS

| | | |
|---|---|---|
| 2,935,728 | 5/1960 | Morgan . |
| 3,055,209 | 9/1962 | Reid et al. .............................. 73/592 |
| 3,223,194 | 12/1965 | Michael . |
| 3,264,864 | 8/1966 | Reid et al. .............................. 73/592 |
| 3,916,699 | 11/1975 | Moran . |
| 4,083,229 | 4/1978 | Anway ............................. 73/40.5 A |
| 4,172,382 | 10/1979 | Murphy et al. ................. 73/40.5 A |
| 4,241,430 | 12/1980 | Kayem . |
| 4,309,576 | 1/1982 | Corrigan . |
| 4,326,416 | 4/1982 | Fredberg .............................. 73/597 |
| 4,494,224 | 1/1985 | Marrell . |

FOREIGN PATENT DOCUMENTS

60-238733 11/1985 Japan ..................................... 73/592
60-238734 11/1985 Japan ..................................... 73/592

OTHER PUBLICATIONS

"Detecting and Locating Instruments," brochure of Fisher Research Lab., (Los Banos, Calif.), Aug. 1984.

*Primary Examiner*—John Chapman
*Attorney, Agent, or Firm*—Calfee, Halter & Griswold

[57] ABSTRACT

A system for detecting the location of an underground portion of a sewer line. A vibration or sound of a predetermined frequency is introduced into an accessible (e.g., above ground) portion of the sewer line. The vibration is allowed to propagate through the sewer line and into the underground portion of the sewer line. The location of the underground portion of the sewer is identified by sensing the vibration by means of a detector located at the ground surface or in an inserted "in ground" device above the underground portion of the sewer line.

4 Claims, 1 Drawing Sheet

SEWER LINE DETECTION SYSTEM

This application relates to a system for detecting the location of an underground (subsurface) pipe or conduit line. It relates particularly to a system for detecting the location of an underground sewer line when it is desired to excavate down to that sewer line for construction and/or improvement reasons.

In construction or improvement projects for commercial or residential structures, it is invariably necessary to locate existing underground sewer lines in order to do construction and/or maintenance work on those sewer lines. Such underground sewer lines may be several inches or even several feet below ground surface, and may be covered by a variety of layers of material, e.g., soil, clay, stone, asphalt, concrete, etc.

In the applicant's experience as an architect, it has been common heretofore to locate underground sewer lines for residential and commercial property by means of "trial and error" or electronic sensing devices requiring a device to enter and move in the pipe. With the "trial and error" technique, the most likely location of the sewer line is pinpointed intuitively, and the excavation then proceeds at that location. In the applicant's experience, the excavation may be only a matter of feet, or even inches, from the real sewer line, and yet miss it by such a trial and error technique. Obviously, when a real sewer line is continuously missed by a trial and error technique, it is time consuming, and results in excessive excavation of the property. With a technique in which a device actually enter and moves in the pipe, the relative size and complexity of the device may restrict the manner in which the device is introduced into the pipe. Also, whether and how to retrieve the device becomes a problem that has to be addressed.

Thus, it is desirable to provide a system for locating an underground sewer line by other than a "trial and error" technique, or by a device which actually enters and moves in the pipe. Further there is a need for techniques that are relatively efficient, economical, and effective to locate the underground sewer line.

In the past, techniques for detecting the location of leaks in underground water lines have been suggested. For example, there are techniques in which amplified sounds of a leak in an underground water line are used to detect the location of that water leak in the line. The technique is specifically designed to amplify the sound of a water leak, to enable the location of that leak to be determined. Such a technique, while useful for its purpose, would not address the problem of locating an underground sewer line, unless the sewer line had a water leak. Also, there are devices which can locate leaks by attaching electronic impulses to a metal pipe or by inserting a transmitting device into the sewer.

SUMMARY OF THE PRESENT INVENTION

The present invention relates to a system designed to take away the element of chance in locating an underground sewer line, and to accurately locate the underground sewer line.

Further, the system of the invention is designed to detect the location of an underground sewer line despite the fact that the sewer line may be a considerable distance below the ground.

Still further, the system of the invention is designed to detect the location of an underground sewer line despite the existence of normal underground noises or vibrations, such as water, gas, etc. which might otherwise fool the detector.

Moreover, the system of the invention is designed to detect the location of an underground sewer line without introducing a device which has to enter and move in the sewer line to the approximate desired location.

The basic concept of the invention contemplates introducing a known vibratory disruption into the sewer line at an accessible location, (e.g. the P-trap of a toilet, an above ground portion of a rain leader, sanitary sewer cleanout, etc.) and transmitting that vibration through the air or through the pipe along the underground (subsurface) portion of the sewer line and then sensing the vibration from the surface at a remote location in order to locate the underground sewer line.

According to the preferred embodiment, the vibration that is introduced into the sewer line is a pulsed (rythmic), predetermined frequency vibration that is different from the type of background vibrations (e.g., sounds) normally produced in an underground sewer line. For example, with sewer lines made of materials such as concrete or polyvinylchloride (PVC), the vibration can be introduced with a horn that produces a pulsed predetermined frequency sound that is different from the type of sounds normally encountered in an underground sewer line. Or, with sewer lines formed of metal, the vibration can be introduced by periodically striking the sewer line. The detector is designed to sense the predetermined frequency, pulsed vibration introduced, and to amplify the vibration, by techniques well known in the art, to enable the location of the underground sewer line to be identified at a remote, surface location.

The further objects and advantages of this invention will become further apparent from the following detailed description and the annexed drawing.

DETAILED DESCRIPTION OF THE PREFERRED EMBODIMENT

Figure 1:
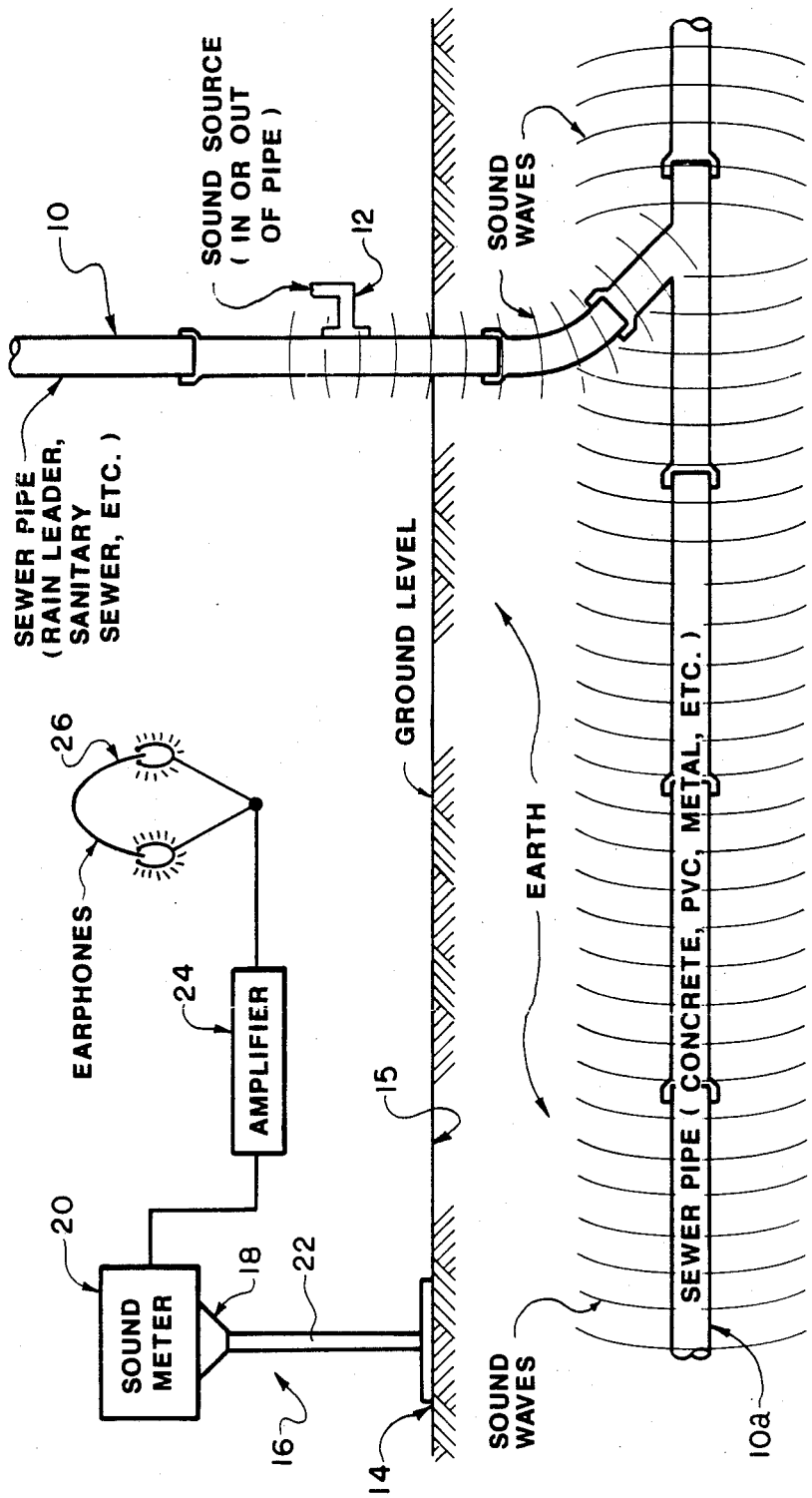
FIG. 1 is a schematic illustration of a system for detecting the location of the sewer line according to the principles of this invention.

FIG. 1 illustrates the basic aspects of applicant's system for detecting an underground sewer line. According to the applicant's system, a pulsed, rythmic, predetermined frequency vibration, of a nature not normally found in a sewer line, is introduced into the sewer line at an above ground location. Thus, in FIG. 1, the vibration is introduced into the sewer line 10 at a known, above ground location, shown schematically at 12. The vibration is directed through the sewer line 10 to a remote underground location, shown schematically at 14, and the vibration is sensed at the surface 15 by an above ground detector 16.

In this application, reference to introduction of a vibration at an "above ground" location is intended to mean that the location is readily accessible without the need to dig into the ground for the special purpose of introducing the vibration. Thus, if one were to introduce a vibration into a portion of a sanitary sewer "clean out" which is normally located in the basement of a building, but technically below the ground line, so long as that portion of the sewer line is accessible without digging into the ground, that would be considered "above ground" for purposes of this application. Some examples of above ground sewer lines which applicant believes are useful for introducing the vibrations are: (i) rain leaders, (ii) sanitary sewers, especially clean outs, and (iii) the P-traps of toilets.

Thus, in FIG. 1, vibration is introduced into the sewer line 10 at the known, above ground location 12. The vibration is transmitted through the air in the line or the pipe walls along the underground (subsurface) portion of the sewer line. The vibration is then detected at an above ground location, downstream or upstream of the point of introduction of the vibration. As shown schematically in FIG. 1, the introduced vibrations propagate from the above ground portion 12 of the sewer line 10 to the portion of the sewer line 10A below the ground. The vibration is sensed from the surface, by means of a detector 16, at a location downstream or upstream of the point of introduction of the vibration, to accurately detect the location of the underground sewer line 10.

Preferably, the vibration introduced into the sewer line is a predetermined frequency, pulsed vibration that is distinct from the type of vibration disruptions normally encountered in an underground sewer system. The vibration can be introduced, for example, by externally tapping on the above ground sewer line, by periodically blowing a horn into the sewer line, or by producing some other pulsed, predetermined frequency vibration inside the sewer line.

The detector 16 must be capable of sensing the particular vibration introduced, despite the existence of extraneous vibration disruptions normally found in the sewer system. For example, when the vibration is introduced by tapping on a metal sewer line, the detector system can comprise (i) a sound level meter 20 designed to contact the surface being tested and capable of detecting pulsed sounds of predetermined frequency, (ii) a metal pipe 22 connected to the sound meter, (iii) a sensitive microphone 18, (iv) a portable amplifier 24, and (v) a set of earphones 26. The detector system can also include a specific wave length filter to help exclude extraneous vibrations.

Applicant has successfully tested the principle of this invention, by introducing a periodic, rythmic vibration into a metal sewer line of a commercial building under construction, by periodically tapping the above ground 8" metal pipe of the downspout of the rain leader, using a hammer and striking the line in a periodic, rythmic fashion. A sound detector, of the type disclosed herein, manufactured and sold by Radio Shack under Model No. 33-2050, was disposed at a location approximately 200 feet downstream of the point of introduction, and on the other side of a soundproof, masonary wall. The sound detector was able to detect the rythmic pinging sound from the surface of a concrete floor the sewer line was embedded in.

Thus, the present invention is believed to be particularly useful in locating an underground sewer line. It is believed that with the foregoing disclosure in mind, there will be further, obvious modifications and adaptations of the applicant's invention that will become apparent to those of ordinary skill in the art.

I claim:

1. A method of excavation of an underground sewer line comprising the steps of introducing a vibration of a predetermined frequency into an above ground portion of the sewer line, allowing the vibration to propagate along the sewer line and into an underground length of sewer line which is substantially free of leaks, sensing the location of the underground portion of the sewer by sensing the vibration by means of detector located at the ground surface above the underground length of the sewer line which is substantially free of leaks, and excavating to the underground sewer line located thereby.

2. A method as defined in claim 1, wherein the step of introducing the vibration into the above ground portion of the sewer line comprises the step of introducing a pulsed vibration into the above ground portion of the sewer line.

3. A method as defined in claim 2, wherein the step of introducing the vibration into the above ground portion of the sewer line is effected by striking the above ground portion of the sewer line at a periodic rate.

4. A. method as defined in claim 2, wherein the step of introducing the vibration into the above ground portion of the sewer line is effected by periodically introducing a noise into the above ground portion of the sewer line.

* * * * *